United States Patent Office 3,366,501
Patented Jan. 30, 1968

3,366,501
CALCINED HYDROPHILIC TALC PIGMENT
Richard S. Lamar, La Canada, Calif., assignor to Cyprus Mines Corporation, New York, N.Y., a corporation of New York
No Drawing. Filed Dec. 10, 1964, Ser. No. 417,518
11 Claims. (Cl. 106—304)

This invention relates to modified talc and more particularly to a method of producing a talc-derived material of exceptional whiteness and to a high brightness coating pigment especially suitable for paper filling applications and as a white pigment in paints, rubber, plastics, etc.

Pigments prepared from talc are commonly strongly hydrophobic. Talc pigments placed on the surface of water will typically float and remain unwet for an indefinite time. The hydrophobic characteristic of conventional talc pigments limits their use in aqueous systems, making wetting difficult and requires the use of special surface active agents to achieve even a degree of wetting.

Carbon is frequently found molecularly dispersed within the talc crystal lattice of many deposits. Carbon causes talc to take on an objectionable gray to black color. The carbon may be released and evolved as carbon dioxide by heating the talc ore at relatively low temperatures in the range of 1400–1600° F. and this procedure is a satisfactory way of removing the molecularly dispersed carbon from the ore of some deposits. However, while this is a satisfactory method for carbon removal from some talc ores, there are other talc ores which upon heating to within the temperature range required to release the carbon will acquire a decided pink or brown cast, this being especially emphasized when the talc product is wet with water or oil. The pink or brown cast acquired by calcining to drive off the carbon is attributable to the presence of iron-containing materials in the calcined product.

It is a principal object of the invention to provide an improved talc-derived pigment of exceptional white color and fine particle size.

It is a still further object of the invention to provide a talc-derived white pigment having hydrophilic properties that make the pigment especially adaptable for use in aqueous systems.

It is another object of the invention to provide an improved talc-derived pigment that is readily wet with oils and other hydrocarbons or oleo resinous substances and which pigment is also strongly hydrophilic.

It is a still further object of the invention to provide a process which permits the manufacture of a white talc-derived pigment from a talc ore containing iron and carbon molecularly dispersed within the talc crystal lattice.

It is a still further object of the invention to provide a process for the production of an exceptionally white pigment from a talc ore containing a significant amount of iron, such as iron-containing minerals.

A further object of the invention is to provide a talc-derived material having good brightness which may be used as a filler, or coating pigment.

Another object of the invention is to provide a talc-derived pigment of exceptional whiteness that is suitable for use in paper making or finishing.

It is a still further object of the invention to provide a talc-derived pigment which may be used in the manufacture of aqueous latex paints.

The particulate talc-derived pigment of the invention is characterized by an exceptionally high degree of hydrophilicity, typically in the range of 70 to 98% based on the calculations of Zettlemoyer. The technique employed by Zettlemoyer in his calculations of the degree of hydrophilicity is described in the Official Digest of the Federation of Paints, Varnishes Production Club, Philadelphia, Pa., December 1957, page 1234, the "Pigment-Vehicle Interface." A typical talc pigment heretofore produced will have a Zettlemoyer degree of hydrophilicity of around 21%. The talc-derived product of the invention is a proto-enstatite made up largely of magnesium silicate and calcium magnesium silicate with the latter material serving to stabilize the proto-enstatite and when prepared as a pigment will have a particle size substantially free of particles larger than 43 microns in their equivalent spherical diameter and will contain not more than about 80% of particles larger than 10 microns and not more than about 50% of particles larger than 6 microns.

In its broad concept the process of the invention comprises heating an iron-containing talc and a calcium oxide-providing material (e.g. calcium carbonate materials) to form a white silicate product and a light-colored iron-calcium complex. Various calcium-containing materials, such as calcite, dolomite, lime, and calcium hydroxide, may be used in the process. The calcining step is preferably carried on for a period of time between 0.5 and 1.0 hour at a temperature in excess of 1700° F. and at a temperature below the sintering or fusion point of the mixture which is approximately between 2400 and 2500° F. The sintered product is exceedingly difficult to grind and for this reason the calcining is carried on at a temperature below fusion. Generally, the calcining is carried on at a temperature of at least 1900° F. and less than 2200° F. The minimum heating time is approximately 0.25 to 0.5 hour and requires the employment of a temperature in the higher portion of the range. Heating of the talc mineral and calcium oxide-providing material for periods of time in excess of 2 hours does not adversely affect the end product. The temperature and time employed will depend to some extent on the type of apparatus used and the quantity of material being processed. The heating or calcining is preferably carried on in a ceramic-lined natural gas-fired rotary kiln. The temperature employed must be adequate to form the light-colored iron-calcium silicate and this generally requires a temperature in excess of 1700° F.

The calcined silicate product of the invention has an exceptionally white color and a Mohs Hardness of 5–6 compared with 1 for native talc. In order to produce a pigment grade product it has been found necessary that the talc be finely ground before calcination and conversion to the proto-enstatite product. Attempts to grind coarse calcined particulate products to a fine particle size has generally met with no success. In a preferred practice of the process of the invention, the iron-containing talc and calcium material are first milled to obtain a finely ground product which has substantially no particles larger than 43 microns in their equivalent spherical diameter and which contains no more than about 80% of particles larger than 10 microns and not more than about 50% of particles larger than 6 microns. The equivalent spherical diameter of a particle is a standard measurement and may be calculated from sedimentation tests.

It has been experienced that while the finely ground material may be calcined, the stack loss from the kiln is objectionably high. For this reason and to facilitate handling the finely ground material is desirably pelletized before calcining. The pelletizing is preferably accomplished with water but other materials are available for bonding the particles together such as hydrocarbon oils or other organic materials. Water or other bonding material in the amount of 10 to 70% of the weight of the ground material is normally adquate for pelletizing. The amount of water or other binding liquid used for pelletizing is that required to form a cohesive pellet. The pellets retain their forms in the calcining operation and are thereafter subjected to a further milling to produce a product having approximately the particle range size characteristic of the milling preceding calcining.

Talc deposits containing carbon and iron, usually in the form of iron oxide or iron sulfide, are not commonly suitable for the manufacture of a white pigment for the reason when the ore is heated to dispose of the carbon as carbon dioxide, the resulting product will have an objectionable pink or brown cast. It has now been found that if the calcining is carried on in the presence of a calcium oxide-providing material, for example, dolomite or limestone, at a somewhat more elevated temperature than required for evolution of the carbon as carbon dioxide an exceptionally white product is produced. At this more elevated temperature the talc ore forms proto-enstatite and a light-colored iron calcium complex. The process of the invention is especially suitable for the processing of talc ore deposits from the Texas counties of Hudspeth and Culberson which deposits have a talc ore made up of talc mineral with lesser amounts of dolomite, a calcium magnesium carbonate rock, and a small percentage of carbon molecularly dispersed within the talc crystal lattice. Talc ore from the Buck Mine in Hudspeth County, Tex., has adequate dolomite present to react or complex with substantially all of the iron present, and to provide calcium oxide for the stabilization of the normally unstable proto-enstatite. Talc ores from other Texas deposits have higher iron contents and in the latter deposits it may be desirable to provide additional dolomite or other calcium carbonate material to react with the iron and to stabilize the proto-enstatite.

The process of the invention may be employed in the treatment of various iron-containing talcs whether or not carbon is present in the talc ore. In some deposits it will be necessary to supply the dolomite or other calcium carbonate to complex the iron. The talc ore from the Buck Mine in Texas contains 5.0% dolomite and 0.20% of iron in the form of iron oxide, $F_2O_3$. It will be appreciated that varying quantities of the calcium carbonate material may be employed in the process of the invention but the amount utilized should be at least that needed to complex with the iron and desirably also to provide the amount of calcium oxide needed to stabilize the proto-enstatite. Generally speaking, the amount of dolomite or limestone or other calcium oxide-providing material utilized will be within the range of 1–10% based on the weight of the talc mineral of the ore being treated.

*Example 1*

Talc ore from the Buck Mine in Hudspeth County, Tex., was crushed and preliminarily ground in a roller mill to approximately 200 mesh. The coarsely ground material was then subjected to fluid energy milling in a Wheeler mill to produce a product having substantially all of its particles less than 10 microns equivalent spherical diameter. Approximately 50% water was added to the powdered talc ore and pellets formed under moderate pressure in a Dravo Disc Pelletizer. The pellets were calcined by direct feed to a ceramic-lined, rotary kiln operating at 1900° F. at the hot-discharge end. The pellets were exposed to the elevated temperature for approximately one-half hour. Following calcining, the pellets were permitted to cool to ambient room temperature and subsequently the pellets were subjected to a final milling to reduce substantially all the particles to less than a 10-micron equivalent spherical diameter.

The product of the foregoing process was successfully incorporated in several formulations of latex paint where it served as a white pigment. In a typical formulation the talc-derived product of the foregoing process was employed in an amount of 296 pounds per one hundred gallons of paint wherein the synthetic resinous materials employed were carboxymethyl cellulose (Methocel 1500 C.P.S., 4% solution) and polyvinyl acetate (Elvacet 1423, 55% solids) in the amount of 259 pounds. The formulation for the 100 gallons of latex also included 358 pounds of water, 50 pounds of 325 mesh silica, 1.9 pounds of an alkyd aryl sulfonate surface active agent (Tamol 731, 25% solution), 13.9 pounds of diethylene glycol, and 23.1 pounds of diethylene glycol ethyl ether (Dowanol D.E.). From the preparation of a number of formulations and control formulations it was established that where the talc derived pigment of the invention was used and incorporated in the amount of 30 to 60% of the pigment volume concentration, the pigment of the invention developed from three to four times as much opacity as a conventional talc pigment. The talc product of the invention yields paints with greater tinting strength and produces cleaner, lighter tints than paints incorporating like quantities of the conventional talc pigment. White paints containing the talc product of the invention are whiter and brighter in color than those made with conventional talc and additionally are lower in viscosity and thixotropy.

The talc product of the invention provides superior pigmentation of starch paper coatings. As a result of comparative tests, it was established that the pigment of the invention shows outstanding opacity and brightening as compared with other pigments including conventional talc pigments. The superiority becomes more pronounced as the amount of starch in the coating is increased or as the binder pigment ratio is raised. The talc derived pigment product of the invention is from two to three times as effective as clay, precipitated calcium carbonate, and conventional talc pigment at starch levels of 20 to 40 parts per 100 parts of pigment. At 10 parts of starch, the superiority is not so marked.

It was also established that starch coating colors pigmented with the talc derived product of the invention exhibits ink receptivity characteristics similar to that of precipitated calcium carbonate and superior to that of a typical talc pigment which generally shows a high ink hold-out.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. A process for producing a white hydrophilic material from an iron-containing talc material, said process comprising:
   heating particulate iron-containing talc and a calcium oxide providing material to a temperature in excess of 1700° F. and below sintering temperature to form a white hydrophilic silicate product, comprising largely magnesium silicate and calcium magnesium silicate and a light-colored iron-calcium complex, said calcium material being present in an amount adequate to complex with substantially all of the iron present.

2. A process in accordance with claim 1 wherein the iron-containing talc and calcium oxide providing material are natural occurring materials of a talc ore.

3. A process in accordance with claim 1 wherein the calcium oxide providing material is a calcium carbonate material.

4. A process in accordance with claim 3 wherein the calcium carbonate material is dolomite.

5. A process for producing a white hydrophilic material from an iron-containing talc, said process comprising:
   heating particulate iron-containing talc and a calcium carbonate material to a temperature in the range of 1700° to 2200° F. to form a white silicate product, comprising largely magnesium silicate and calcium magnesium silicate and a light-colored iron-calcium complex, said calcium carbonate material being present in an amount adequate to complex with substantially all of the iron present.

6. A process for producing a white hydrophilic pigment material from an iron-containing talc, said process comprising:

milling the iron-containing talc and a calcium oxide providing material to obtain a finely ground product having substantially no particles larger than 43 microns in their largest equivalent spherical diameter and containing no more than 80% of particles larger than 10 microns and not more than about 50% of particles larger than 6 microns, said calcium material being present in an amount adequate to complex with substantially all of the iron present; and heating the ground product at a temperature in the range of 1700° to 2200° F. to form a white magnesium silicate product and a light-colored iron-calcium complex.

7. A process for producing a white hydrophilic pigment material, said process comprising:

milling a talc ore containing talc mineral, an iron compound and dolomite to obtain a finely ground product having substantially no particles larger than 43 microns in their largest equivalent spherical diameter and containing no more than 80% of particles larger than 10 microns and not more than about 50% of particles larger than 6 microns, said dolomite being present in an amount adequate to provide the calcium needed to complex with the iron; and heating the ground product at a temperature in the range of 1700° F. to 2200° F. to form a white magnesium silicate product and a light-colored iron-calcium complex.

8. A process for producing a white hydrophilic pigment material, said process comprising:

milling a talc ore containing talc mineral, a discoloring iron compound and dolomite to obtain a finely divided ground product having substantially no particles larger than 43 microns in their largest equivalent spherical diameter and containing no more than 80% of particles larger than 10 microns and not more than about 50% of particles larger than 6 microns, said dolomite being present in an amount adequate to supply the calcium needed to complex with the iron;

forming pellets from the finely ground material;

heating the pelletized material at a temperature in the range of 1700° F. to 2200° F. to produce a white magnesium silicate product and a light-colored iron calcium complex; and subjecting the pellets to a further milling to provide a product having substantially no particles larger than 43 microns in their largest equivalent spherical diameter and containing no more than 80% of particles larger than 10 microns and not more than about 50% of particles larger than 6 microns.

9. A process for producing a white hydrophilic product from an iron-containing talc, said process comprising:

milling the iron-containing talc and a calcium carbonate material to obtain a finely ground product having substantially no particles larger than 43 microns in their largest equivalent spherical diameter and containing no more than about 80% of particles larger than 10 microns and not more than about 50% of particles larger than 6 microns, said calcium material being present in an amount capable of complexing with substantially all of the iron present;

adding water to the finely ground mixture and forming pellets therefrom;

heating the pelletized mixture at a temperature in the range of 1700° to 2200° F. to produce a white colored magnesium silicate product and a light-colored iron-calcium complex; and subjecting the pellets to a further milling to produce a product having substantially no particles larger than 43 microns in their largest equivalent spherical diameter and containing not more than about 80% of particles larger than 10 microns and not more than about 50% of particles larger than 6 microns.

10. A talc-derived hydrophilic product made up principally of calcined magnesium silicate and a light-colored iron-calcium complex, and having a particle size substantially free of particles larger than 43 microns in their largest spherical effective diameter and containing not more than about 80% of particles larger than 10 microns and not more than about 50% of particles larger than 6 microns, said product being further characterized by having a degree of hydrophilicity in the range of 70 to 98% based on the calculations of Zettlemoyer.

11. A white hydrophilic pigment comprising largely magnesium silicate and calcium magnesium silicate and a light-colored iron-calcium complex, and having substantially no particles larger than 43 microns in the largest spherical effective diameter and containing not more than about 80% of particles larger than 10 microns, said pigment being produced by the calcining of a mixture of talc and a calcium carbonate containing material which had been previously ground to the foregoing particle size range.

References Cited

UNITED STATES PATENTS 2,844,486   7/1958   Lamar    106—306

OTHER REFERENCES

Ewell: Nat. Bor. Std. Journ. of Res., p. 848, vol. 15, 1935, pp. 551–556.

Ferr et al.: Treatise on Color Manos; Charles Griffin & Co. Ltd., London, 1908, p. 381.

TOBIAS E. LEVOW, *Primary Examiner.*

S. E. MOTT, *Assistant Examiner.*

UNITED STATES PATENT OFFICE

CERTIFICATE OF CORRECTION

Patent No. 3,366,501                                                   January 30, 1968

Richard S. Lamar

It is hereby certified that error appears in the above numbered patent requiring correction and that the said Letters Patent should read as corrected below.

Column 4, line 51, strike out "hydrophilic".

Signed and sealed this 22nd day of April 1969.

(SEAL)
Attest:

Edward M. Fletcher, Jr.                                EDWARD J. BRENNER
Attesting Officer                                             Commissioner of Patents